(12) United States Patent
Hurley (10) Patent No.: US 11,938,613 B2
(45) Date of Patent: Mar. 26, 2024

(54) MODULAR MAGNETIC SUPPORT STRIP

(71) Applicant: Jonathan Hurley, Tacoma, WA (US)

(72) Inventor: Jonathan Hurley, Tacoma, WA (US)

( * ) Notice: Subject to any disclaimer, the term of this patent is extended or adjusted under 35 U.S.C. 154(b) by 0 days.

(21) Appl. No.: 17/245,773

(22) Filed: Apr. 30, 2021

(65) Prior Publication Data

US 2022/0347833 A1    Nov. 3, 2022

(51) Int. Cl.
    *B25H 3/04*    (2006.01)
(52) U.S. Cl.
    CPC ..................... *B25H 3/04* (2013.01)
(58) Field of Classification Search
    CPC . B25H 3/06; B25H 3/00; B25H 3/023; B25H 1/12; B25H 3/027; B25H 1/14; B25H 5/00; F16M 11/10; F16M 11/42; F16M 13/00; F16M 11/28
    USPC ....... 211/70.6; 220/23.4; 224/547, 562, 553, 224/564; 248/309.1, 206.5, 309.4
    See application file for complete search history.

(56) References Cited

U.S. PATENT DOCUMENTS

| | | | |
|---|---|---|---|
| 2,565,625 A | 8/1951 | Phelon | |
| 2,958,019 A * | 10/1960 | Scholten | B23Q 3/1546 335/285 |
| 2,966,992 A * | 1/1961 | Dunkelberger | B25H 3/04 211/DIG. 1 |
| 3,746,992 A * | 7/1973 | Serembe | B43L 5/022 33/DIG. 1 |
| 3,748,614 A * | 7/1973 | Holtz | G09F 7/04 335/303 |
| 3,868,016 A * | 2/1975 | Szpur | A61B 50/33 211/DIG. 1 |
| 4,410,095 A | 10/1983 | Dembicks | |
| 4,544,067 A * | 10/1985 | Miller | B25H 3/04 211/DIG. 1 |
| 4,826,059 A * | 5/1989 | Bosch | A45C 11/24 211/DIG. 1 |
| 5,456,359 A * | 10/1995 | Horn | B25H 3/06 211/DIG. 1 |
| 5,544,747 A * | 8/1996 | Horn | B25H 3/06 211/DIG. 1 |

(Continued)

FOREIGN PATENT DOCUMENTS

CN    211682001 U    10/2020

OTHER PUBLICATIONS

Grip, "Grip 67446 Magnetic Tool Holder Set, Black, 3 Piece, 8," found on amazon.com, <https://www.amazon.com/67446-Magnetic-Holder-Black-Piece/dp/B0009WPND8>, retrieved Feb. 1, 2021, 9 pages, first available Jun. 10, 2009.

(Continued)

*Primary Examiner* — Steven A. Reynolds
*Assistant Examiner* — Prince Pal
(74) *Attorney, Agent, or Firm* — Christensen O'Connor Johnson Kindness PLLC (57) ABSTRACT

A modular magnetic strip holder 10 is assembled from a plurality of individual magnetic holder units 12 into an elongated strip holder configuration for securely holding various types of tools, utensils and other items. Various configurations of connectors may be utilized to assemble together in end-to-end relationship any number of individual magnetic holder units 12 so as to form an elongated strip holder of a desired length, while also enabling the magnetic strip holder 10 to be disassembled if desired.

16 Claims, 5 Drawing Sheets

(56) References Cited

U.S. PATENT DOCUMENTS

| | | | | |
|---|---|---|---|---|
| 5,669,516 A * | 9/1997 | Horn | | B25H 3/06 |
| | | | | 211/DIG. 1 |
| 5,760,668 A * | 6/1998 | Testa | | B23Q 3/1546 |
| | | | | 211/DIG. 1 |
| 5,803,422 A * | 9/1998 | Buehler | | A47B 96/02 |
| | | | | 248/339 |
| 5,855,285 A * | 1/1999 | Laird | | B25H 3/003 |
| | | | | 206/378 |
| 5,971,379 A * | 10/1999 | Leon, Jr. | | B25B 5/142 |
| | | | | 269/45 |
| 6,109,569 A * | 8/2000 | Sakaida | | F16L 3/222 |
| | | | | 248/62 |
| 6,237,767 B1 * | 5/2001 | Lee | | B25H 3/023 |
| | | | | 206/234 |
| 6,677,846 B2 * | 1/2004 | Snider | | A47L 13/40 |
| | | | | 335/302 |
| 6,719,155 B1 * | 4/2004 | Chang | | B25H 3/04 |
| | | | | 211/DIG. 1 |
| 6,811,127 B1 * | 11/2004 | Shiao | | B25H 3/04 |
| | | | | 211/DIG. 1 |
| 7,172,079 B1 * | 2/2007 | Shiao | | B25H 3/04 |
| | | | | 206/379 |
| 7,185,770 B1 * | 3/2007 | Roten | | A47B 81/00 |
| | | | | 211/70.6 |
| 7,310,035 B2 * | 12/2007 | Wooten | | H01F 7/0252 |
| | | | | 335/302 |
| 9,205,552 B2 | 12/2015 | Kao | | |
| 9,314,315 B2 * | 4/2016 | Wong | | A61B 50/22 |
| 9,560,923 B1 * | 2/2017 | Winnard | | B25H 3/04 |
| 9,666,346 B2 * | 5/2017 | Noh | | C23C 14/042 |
| 10,052,754 B1 * | 8/2018 | Coleman, Jr. | | B25H 3/04 |
| 10,113,690 B1 * | 10/2018 | Hall | | B25H 3/04 |
| 10,413,092 B2 * | 9/2019 | Winnard | | A47F 5/0823 |
| 10,677,388 B2 * | 6/2020 | Hall | | F16B 1/00 |
| 2002/0130231 A1 * | 9/2002 | Winnard | | B25H 3/04 |
| | | | | 248/206.5 |
| 2003/0043005 A1 * | 3/2003 | Snider | | H01F 7/0257 |
| | | | | 335/284 |
| 2003/0230606 A1 * | 12/2003 | Devinie | | A45F 5/00 |
| | | | | 224/183 |
| 2004/0050735 A1 * | 3/2004 | Coleman, Jr. | | B25H 3/003 |
| | | | | 206/378 |
| 2004/0238466 A1 * | 12/2004 | Shiao | | B25H 3/04 |
| | | | | 211/DIG. 1 |
| 2006/0081547 A1 * | 4/2006 | Queen | | B25B 21/00 |
| | | | | 211/70.6 |
| 2010/0065519 A1 * | 3/2010 | Nguy | | B25H 3/04 |
| | | | | 211/70.6 |
| 2010/0269400 A1 * | 10/2010 | Gesik | | A01K 97/06 |
| | | | | 43/57.1 |
| 2013/0254976 A1 * | 10/2013 | Aravena | | F41C 33/00 |
| | | | | 224/183 |
| 2016/0068303 A1 * | 3/2016 | Schroeder | | B65D 21/0204 |
| | | | | 220/23.4 |
| 2018/0361564 A1 * | 12/2018 | Hurley | | B25H 3/04 |
| 2019/0387705 A1 * | 12/2019 | Firth | | A01K 1/0613 |
| 2020/0122315 A1 | 3/2020 | Hurley | | |

OTHER PUBLICATIONS

Magnebricks, "MagneBricks Innovative Magnetic Interlocking Building System by Richard Laboris," Kickstarter webpage, <https.www.kickstarter.com/projects/rlaboris/magnebricks-better-magnetic-building-blocks> [retrieved Feb. 1, 2021], 30 pages, Jun. 17, 2013.
International Search Report and Written Opinion dated Aug. 17, 2022, issued in corresponding International Patent Application No. PCT/US2022/026300, filed Apr. 26, 2022, 15 pages.

* cited by examiner

MODULAR MAGNETIC SUPPORT STRIP

BACKGROUND

A typical magnetic strip holder for holding tools, knives, and other kitchen utensils is constructed of a fixed length magnet mounted on a backing bar that is designed for attachment to a wall or other surface. In this regard, holes extend through the ends of the backing bar to receive screws therethrough. The strip holder is of fixed length, and thus may not always fit at the location where it is desirable to mount the magnetic strip holder. Also, it is necessary to physically mount the backing bar on a wall or surface, even if the surface is ferromagnetic, because the strip holder is not able to be magnetically attached to the ferromagnetic surface. The present disclosure seeks to address the drawbacks of existing magnetic strip holders.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a magnetic modular strip holder is composed of individual magnetic holder units that are interconnected to form the strip holder of a desired length, the magnetic holder units including: an elongate housing; a magnet disposed within the housing, the magnet having a front surface, a back surface, and end services; a ferromagnetic plate disposed along the back surface of the magnet and within the housing; and an inner connector for interconnecting adjacent individual magnetic holder units.

In any of the embodiments disclosed herein, wherein the magnet is in the shape of an orthotope.

In any of the embodiments disclosed herein, wherein the orthotope is of a shape selected from a right rectangular prism, rectangular cuboid, and rectangular parallelpiped.

In any of the embodiments disclosed herein, wherein the ferromagnetic plate overlies substantially the entirety of the back surface of the magnet.

In any of the embodiments disclosed herein, wherein the inter-connector comprises a second ferromagnetic plate attached to one end of the magnet of a first magnetic holder unit for attraction to the opposite end of an adjacent magnetic holder unit.

In any of the embodiments disclosed herein, wherein the second ferromagnetic plate projects from the adjacent portion of the housing.

In any of the embodiments disclosed herein, wherein the end surface of the magnet opposite the location of the second ferromagnetic plate is recessed into the adjacent portion of the housing to define a shallow cavity within the housing.

In any of the embodiments disclosed herein, wherein the cavity in the housing is sized and shaped to receive the second ferromagnetic plate of the adjacent magnetic holder unit.

In any of the embodiments disclosed herein, wherein the housing defines a first end and an opposite second end, and the interconnector comprises a dovetail projecting from the housing to engage the correspondingly shaped slot formed in the housing of an adjacent magnetic unit.

In any of the embodiments disclosed herein, wherein the dovetail projects from the housing at a location corresponding to the back surface of the magnet, and the corresponding slot formed in the housing at a location corresponding to the back surface of the magnet.

In any of the embodiments disclosed herein, wherein the housing comprises top and bottom surfaces, and further comprising a mounting projection projecting from at least one of the top and bottom surfaces of the housing.

In any of the embodiments disclosed herein, wherein a through hole extends through the mounting projection for receiving mounting hardware therethrough.

In any of the embodiments disclosed herein, wherein the housing has a back surface corresponding to the back surface of the magnet, and the mounting projection is disposed as substantially flush with the back surface of the housing.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Various example embodiments of the present disclosure are described below with reference to the accompanying drawings in which some example embodiments are illustrated. In the figures, the thicknesses of lines, layers and/or regions may be exaggerated for clarity.

While example embodiments are capable of various modifications and alternative forms, embodiments thereof are shown by way of example in the figures and are described in detail below. It should be understood, however, that there is no intent to limit example embodiments to the particular forms disclosed, but on the contrary, example embodiments are to cover all modifications, equivalents, and alternatives falling within the scope of the disclosure.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be considered in the specific context this definition is given herein.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. Further, it will be appreciated that embodiments of the present disclosure may employ any combination of features described herein.

The present application may include references to directions, such as "forward," "rearward," "front," "back," "ahead," "behind," "upward," "downward," "above," "below," "top," "bottom," "right hand," left hand," "in," "out," "extended," "advanced," "retracted," "proximal," "distal," "central," "vertical," etc. These references and other similar references in the present application are only to assist in helping describe and understand the present invention and are not intended to limit the present invention to these directions or locations.

The present application may also reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc.

The present application may include modifiers such as the words "generally," "approximately," "about", or "substantially." These terms are meant to serve as modifiers to indicate that the "dimension," "shape," "temperature," "time," or other physical parameter in question need not be exact, but may vary as long as the function that is required to be performed can be carried out. For example, in the phrase "generally circular in shape," the shape need not be exactly circular as long as the required function of the structure in question can be carried out. If a quantitative value is needed to render the applicable parameter sufficiently definite, the applicable parameter is within five percent (5%) of the designated parameter value.

In the present application the term "ferromagnetic material" refers to a material that is strongly attracted by a magnet, or magnetic field, such as iron, steel, nickel, cobalt, etc. Also the term "magnetic holder units" may be referred to as "magnetic units" or "holder units." In addition, the term kitchen utensil(s) may include, for example, knives, spoons, forks, ladles, scoopers, spatulas, scissors, mallets, crackers, presses, tongs, peelers, graters, whisks, can openers, mashers, basters, slicers, measuring cups, brushes slicers, etc.

In the following description, various embodiments of the present disclosure are described. In the following description and in the accompanying drawings, the corresponding systems assemblies, apparatus, and units may be identified by the same part number, but with an alpha suffix or by a prime ("'") or double prime ("''") or even a triple prime ("'''") designation. The descriptions of the parts/components of such systems assemblies, apparatus, and units that are the same or similar are not repeated so as to avoid redundancy in the present application.

Figure 1:
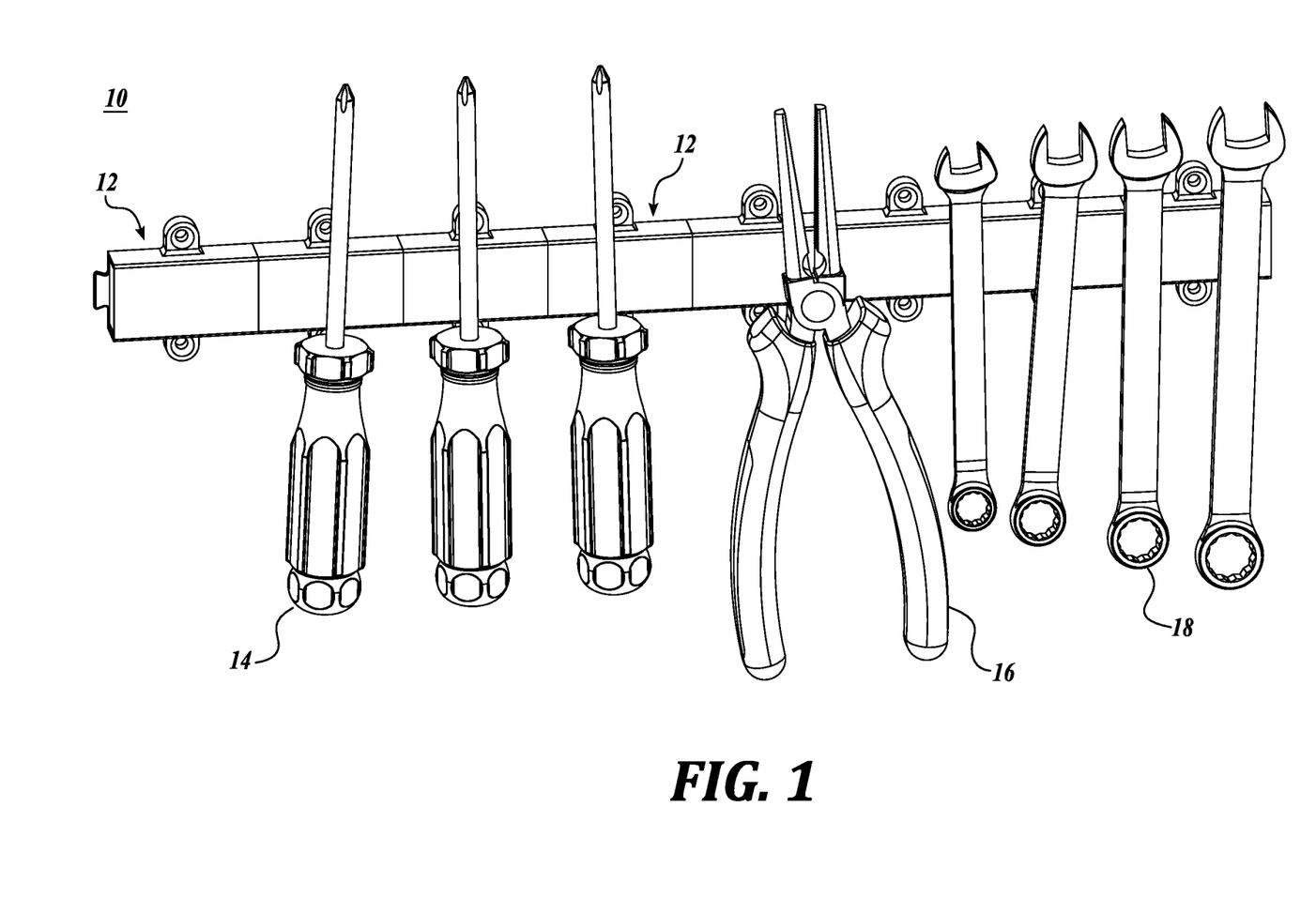
FIG. 1 is a pictorial view of the magnetic modular strip holder of the present disclosure wherein a plurality of modular magnetic holder units are assembled together to form an elongated holder shown as holding various types of tools.

Referring initially to FIG. 1, a modular magnetic strip holder 10 for holding tools, utensils and other items, such as knives or kitchen utensils, are illustrated as assembled from a plurality of individual magnetic holder units 12 into an elongated holder configuration, illustrated as securely holding various types of tools, including, for example, screwdrivers 14, needle nose pliers 16 and boxer wrenches 18. Various configurations of connectors, as described below, may be utilized to assemble together the individual magnetic holder units 12 so as to form an elongated holder configuration of the desired length, while also enabling the holder 10 to be disassembled if desired.

Figure 2:
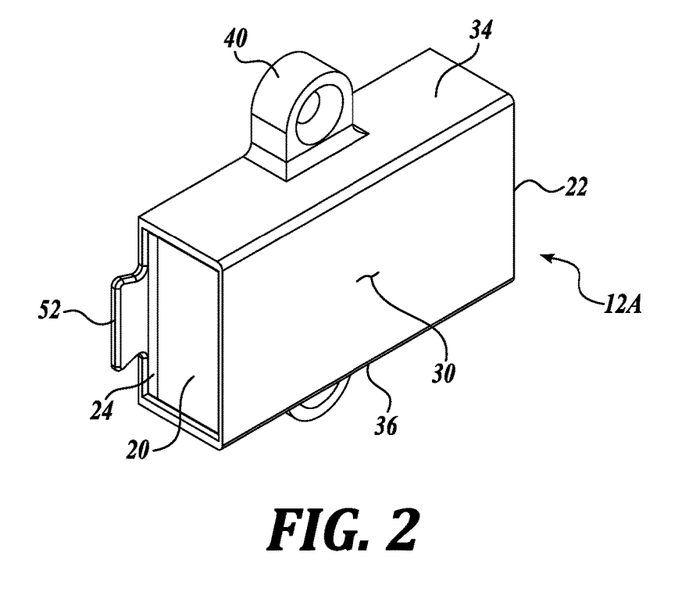
FIG. 2 is a pictorial view of modular magnetic holder unit in accordance with the present disclosure.
Figure 3:
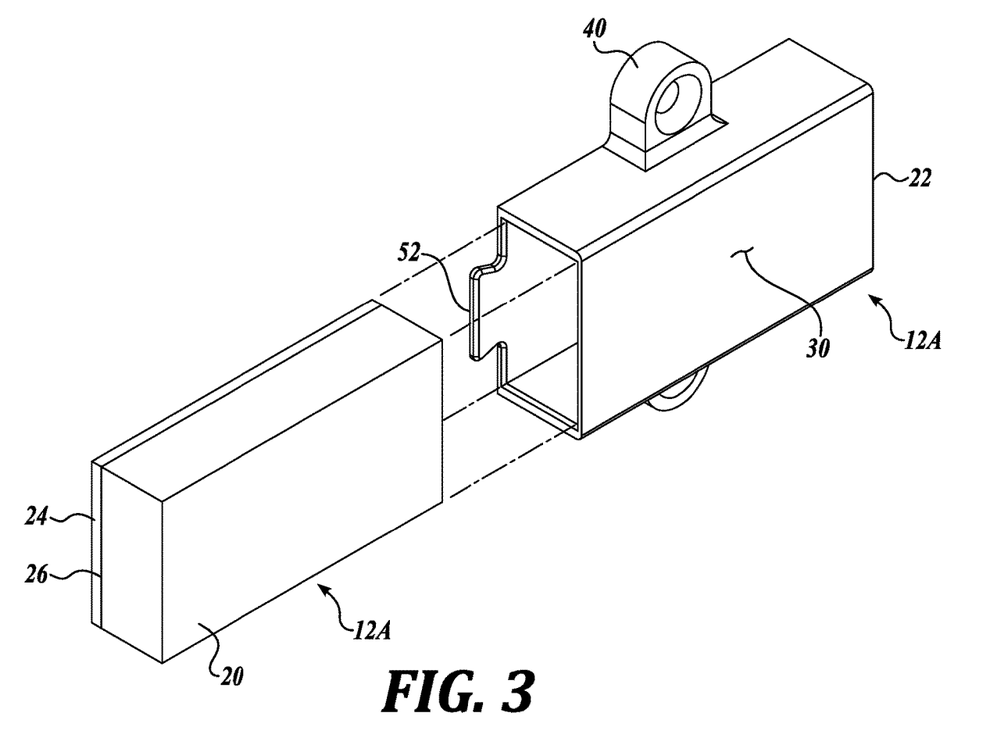
FIG. 3 is a pictorial view of FIG. 2 showing the magnet and a ferromagnetic plate disassembled from the housing.
Figure 4:
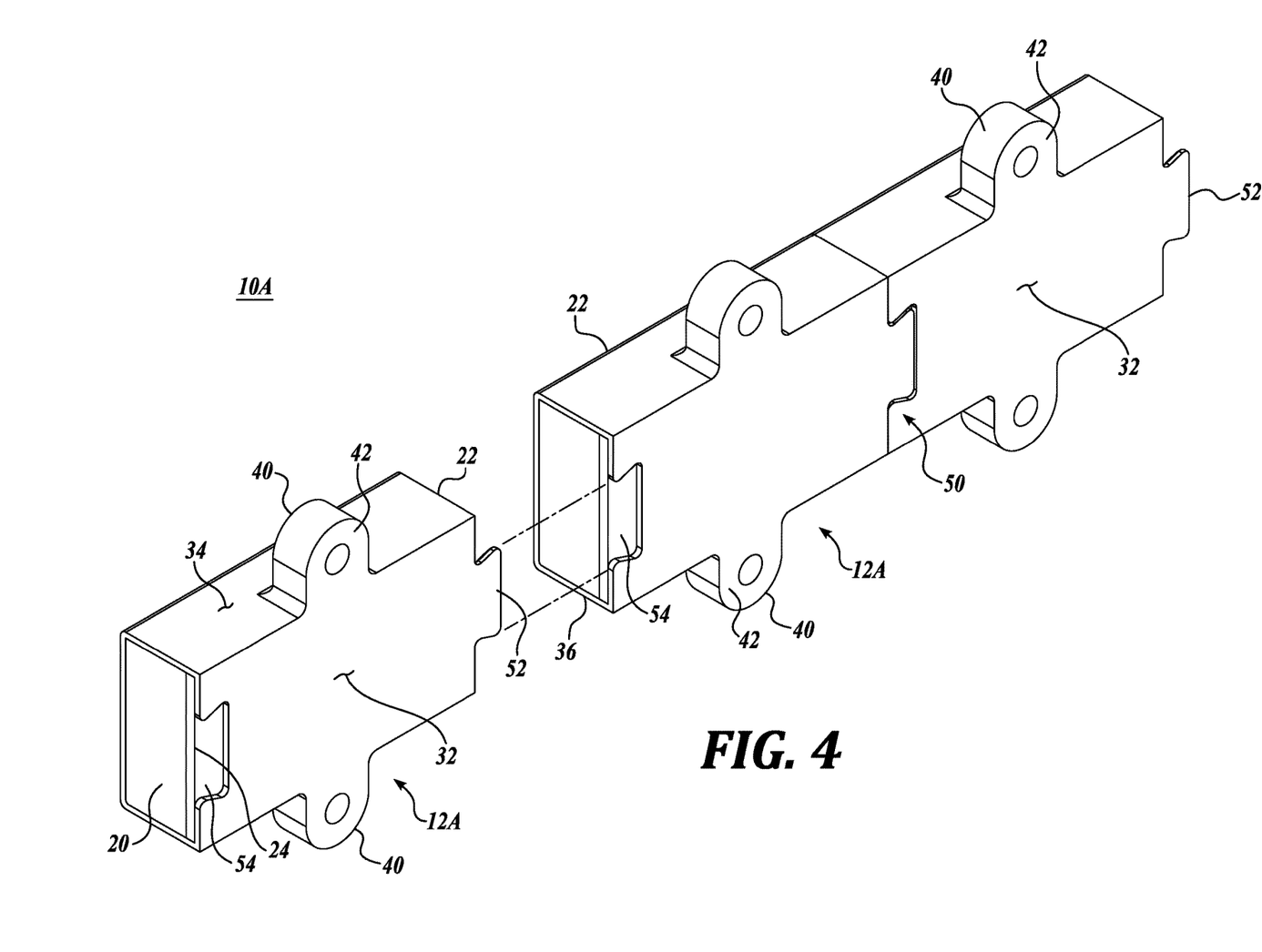
FIG. 4 is a pictorial view showing the connector for connecting the modular magnetic holder units of FIGS. 2 and 3.

Individual magnetic holder units 12A are illustrated in FIGS. 2, 3, and 4, which can be assemble together to form a strip holder 10A, The holder units 12A include a magnet 20 disposed within a correspondingly shaped housing 22. A ferromagnetic plate 24 is disposed in face-to-face relationship with the back surface 26 of the magnet 20. The overall shape of the ferromagnetic plate 24 corresponds to that of the magnet 20 so that the ferromagnetic plate overlaps or covers the entire back surface 26 of the magnet 20. The ferromagnetic plate 24 may be attached to the magnet 20 by any convenient means, including with an adhesive.

The magnet 20, together with its corresponding ferromagnetic plate 24, are snuggly received within the housing 22, which housing is open at its ends. The housing 22 includes a substantially planar front surface 30 for receiving there against items to be held, such as tools 14, 16, and 18, as well as knives or other items. Likewise, the back surface 32 of the housing 22 may be substantially flat so as to bear flat against the wall or other surface on which the modular magnetic strip holder 10A may be mounted. The housing 22 also includes a top surface 34 and a bottom surface 36 that span between the front and back surfaces 30 and 32.

The magnet 20 is shaped in the form of a three-dimensional orthotope, with specific forms of orthotopes including right rectangular prisms, rectangular cuboids, and rectangular parallelepipeds. In this regard, each surface of the magnet 20 is rectangular in shape and is disposed at a 90° angle from adjacent services of the magnet. It is to be understood that the magnet 20 does not necessarily have to be in the shape illustrated in FIGS. 2, 3, and 4, but rather can be of other shapes.

As noted above, the ferromagnetic plate 24 is of a shape corresponding to the shape of the magnet 20 so that the magnet 20 together with the ferromagnetic plate 24 form a unitary orthotope shape. It will be appreciated that the ferromagnetic plate 24 enables the strip holder 10A to be mounted on a ferromagnetic surface without the need of mounting screws or bolts or an adhesive or other mounting means. Rather the magnetic holder unit(s) 12A will adhere directly to the ferromagnetic surface via magnetic attraction.

However, if the available mounting surface is not of ferromagnetic composition, mounting projections or ears 40, that extend upwardly from the upper surface 34 and/or downwardly from the lower surface 36 of the housing 22, can be used to mount the magnetic holder unit(s) 12A. Screws, bolts, or other hardware can extend through holes formed in the projections 40 for mounting the magnetic holder units 12A to a surface, in particular to a non-ferromagnetic surface. As shown in FIGS. 2-4, the back surfaces 42 of the mounting projections 40 are co-planer with the back surface 32 of the housing 22. Also, as shown in FIGS. 2 and 3, the through holes in the mounting projections 40 can be countersunk, to accommodate the head of the screw, bolt, or other hardware member.

As also shown in FIGS. 2-4, magnetic holder units 12A are interconnected together by a connection system 50 composed of a dovetail 52 projecting from the housing back surface or wall 32 for engagement into the correspondingly shaped and sized slot 54 formed in the adjacent portion of the housing back surface or wall 32 of the adjacent housing 22. In this manner, as many magnetic holder units 12A as desired may be assembled together.

Figure 5:
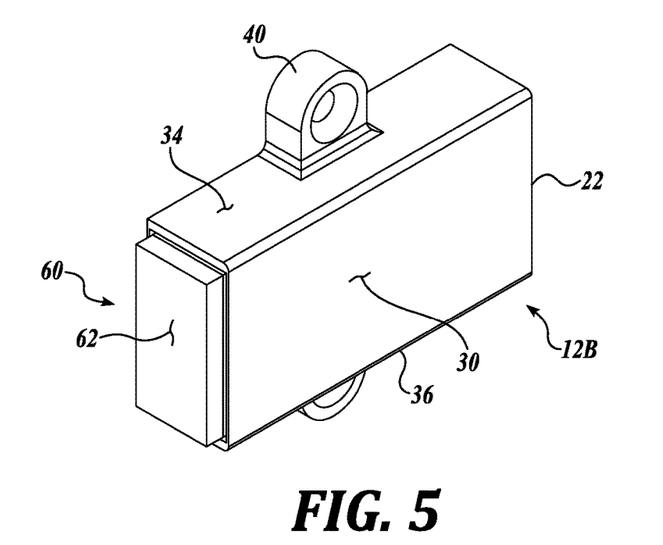
FIG. 5 is a pictorial view of the modular magnetic holder unit in accordance with the present disclosure.
Figure 6:
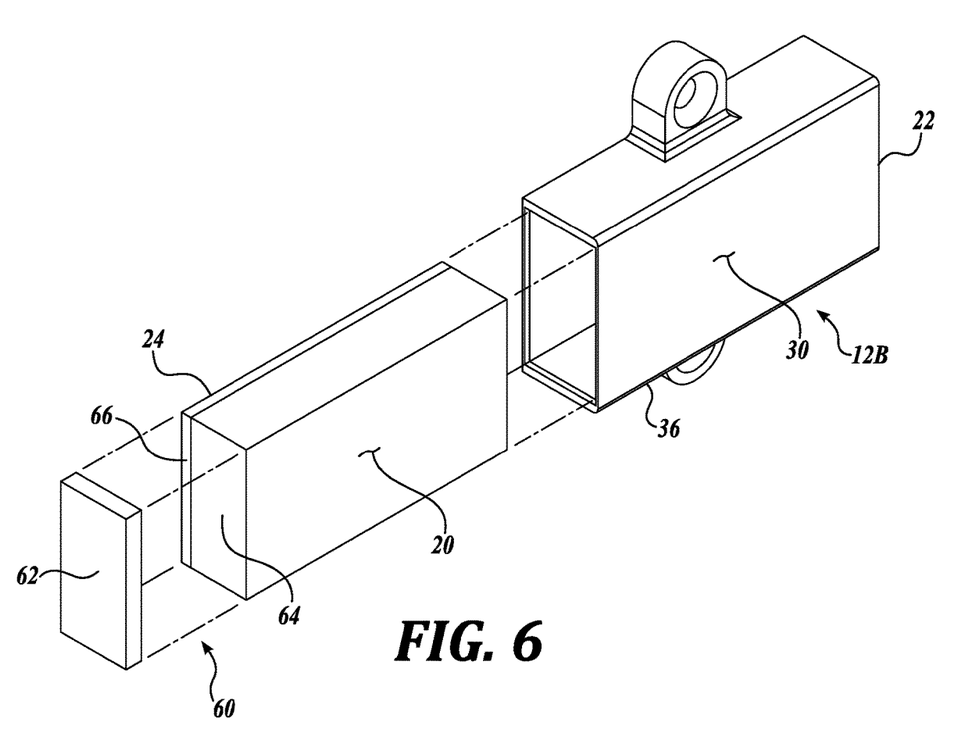
FIG. 6 is a pictorial view of FIG. 5 showing the magnet and the ferromagnetic plates disassembled from the housing.
Figure 7:
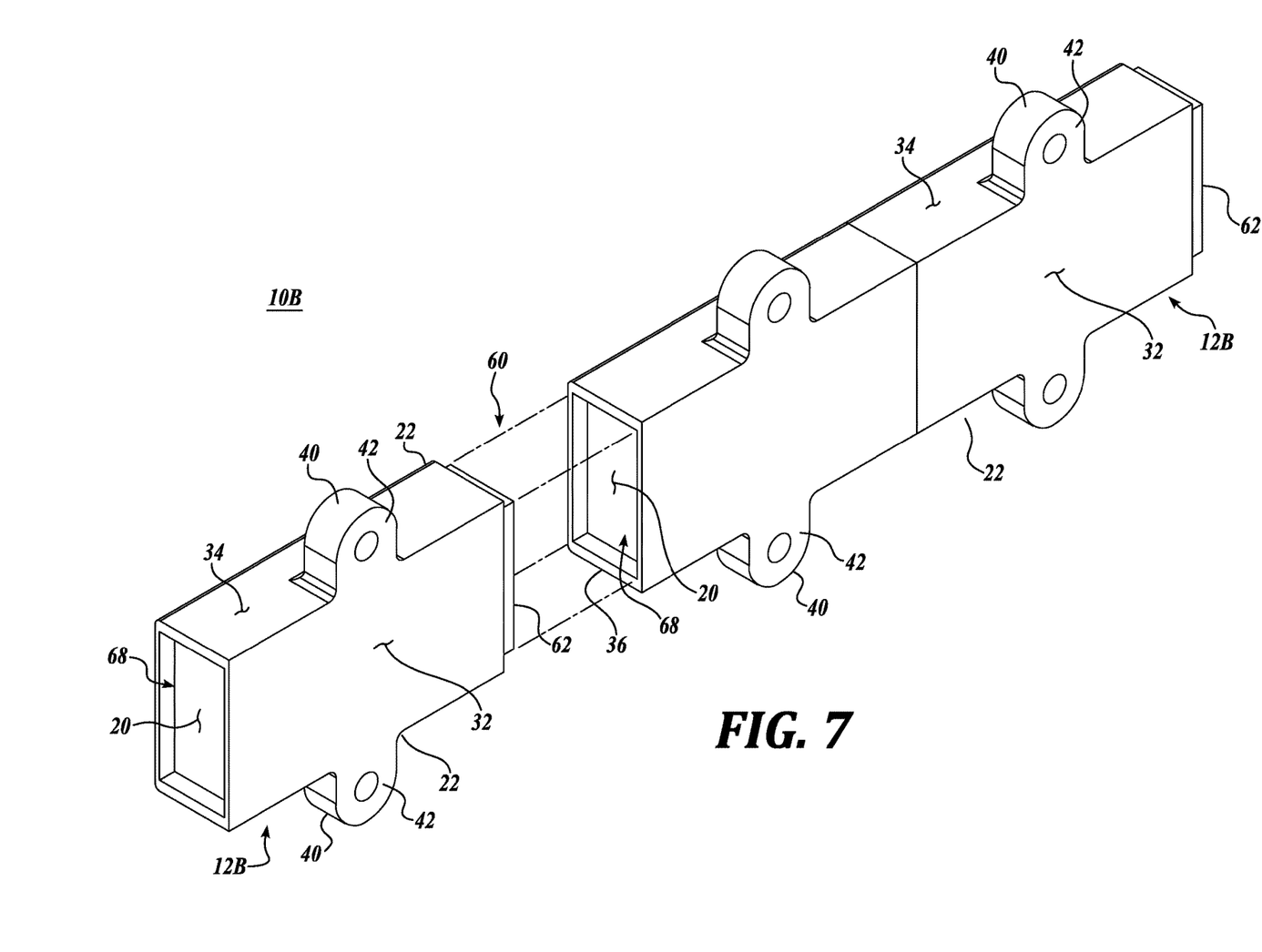
FIG. 7 is a pictorial view showing the connector for interconnecting the modular magnetic holder units of FIGS. 5 and 6.

An embodiment of a modular magnetic strip holder 10B is illustrated in FIGS. 5, 6, and 7. The components of the modular magnetic strip holder 10B that are the same or very similar to the components of the modular magnetic strip holder 10A are identified by the same part numbers and their description will not be repeated. One difference between the modular magnetic strip holders 10A and 10B is that the construction of the connection system 60 of holder 10B compared to the connection system 50 of holder 10A. The connection system 60 used to interconnect adjacent magnetic holder units 12B includes a second ferromagnetic plate 62 that is positioned transversely over the end 64 of magnet 20 and the end 66 of ferromagnetic plate 24. The second ferromagnetic plate 62 is shaped and sized to closely overlap and cover the ends 64 and 66 of the magnet 20 and ferromagnetic plate 24.

Also, the second ferromagnetic plate 62 projects from the end of the housing 22 to engage within a shallow recess 68 formed in the end of the adjacent housing 22, thereby to physically connect and lock with the magnet 20 of the corresponding magnetic holder unit 12B. In this manner, any number of magnetic holder units 12B can be assembled together to form strip holder 10B in a desired length. Moreover, the magnetic holder units 12B can be easily disassembled and reconfigured if desired.

The housing 22 can be constructed from a plastic, rubber, synthetic rubber, or similar material so as not to scratch the tools, knives, or other utensils or items being held by strip holder 10. Also, the magnet 20 and ferromagnetic plate 24 may be secured within the housing 22 by an adhesive, by shrink fitting, or by other means. Alternatively, the housing 22 can be formed or molded around the magnet 20 and the ferromagnetic plate 22.

While illustrative embodiments of the present disclosure have been illustrated and described, it will be appreciated that various changes can be made therein without departing from the spirit and scope of the present invention. For example, in connector system 50 the dovetail 52 can be replaced by projections of other shapes or configurations to engage or lock within corresponding slots or grooves formed in the adjacent housing 22. Also, rather than using a dovetail, a slot, such as slot 54, can be formed at each end of the housing back wall 32 and a double dovetail key can be engageable within the two adjacent slots to lock adjacent magnetic holder units 12A together.

Also, the magnetic strip holder 10 can be used to securely hold or store items in addition to tools and utensils, for example, pots, pans, instruments, etc.

The embodiments of the invention in which an exclusive property or privilege is claimed are defined as follows:

1. A magnetic modular strip holder composed of individual magnetic holder units that are interconnected to form a linear magnetic strip holder of a desired length, each of the magnetic holder units comprising:
   a magnet having a front surface, a back surface, a top surface, a bottom surface, and end surfaces;
   an individual ferromagnetic plate disposed along and attached to the back surface of each magnet;
   an elongate housing individually enveloping each magnet and the ferromagnetic plate, the housing having surfaces overlying the front, top and bottom surfaces of each magnet and the ferromagnetic plate, but not the end surfaces of the magnet; and
   a connector associated with eah individual magnetic holder unit and comprising an extension of the housing and disposed on the same plane as one of the housing surfaces to extend beyond an end surface of the magnet enveloped by the housing to engage and lock with the surface of the housing of an adjacent individual magnetic holder unit to place the magnetic holder units in linear end to end relationship.

2. The magnetic modular strip holder of claim 1, wherein the magnet is in the shape of an orthotope.

3. The magnetic modular strip holder of claim 2, wherein the orthotope is of a shape selected from a right rectangular prism, rectangular cuboid, and rectangular parallelpiped.

4. The magnetic modular strip holder of claim 1, wherein the ferromagnetic plate overlies substantially the entirety of the back surface of the magnet.

5. A magnetic modular strip holder composed of individual magnetic holder units that are interconnected to form the strip holder of a desired length, the magnetic holder units comprising:
   an elongate housing;
   a magnet disposed within the housing, the magnet having a front surface, a back surface, and end surfaces;
   a ferromagnetic plate disposed along the back surface of the magnet and within the housing;
   a connector for interconnecting adjacent individual magnetic holder units,
   wherein the inter-connector comprising a second ferromagnetic plate attached to one end of the magnet of a first magnetic holder unit for attraction to the opposite end of an adjacent magnetic holder unit.

6. The magnetic modular strip holder of claim 5, wherein the second ferromagnetic plate projects from the adjacent portion of the housing.

7. The magnetic modular strip holder of claim 6, wherein the end surface of the magnet opposite the location of the second ferromagnetic plate is recessed into the adjacent portion of the housing to define a shallow cavity within the housing.

8. The magnetic modular strip holder of claim 7, wherein the cavity in the housing is sized and shaped to receive the second ferromagnetic plate of the adjacent magnetic holder unit.

9. The magnetic modular strip holder of claim 1:
wherein the housing defines a first end and an opposite second end;
the interconnector comprising a dovetail projecting from the housing to engage the correspondingly shaped slot formed in the housing of an adjacent magnetic unit.

10. The magnetic modular strip holder of claim 9, wherein the dovetail projects from the housing at a location corresponding to the back surface of the magnet, and the corresponding slot formed in the housing at a location corresponding to the back surface of the magnet.

11. The magnetic modular strip holder of claim 1:
wherein the housing comprises top and bottom surfaces;
further comprising a mounting projection projecting from at least one of the top and bottom surfaces of the housing.

12. The magnetic modular strip holder of claim 11, wherein a through hole extending through the mounting projection for receiving mounting hardware therethrough.

13. The magnetic modular strip holder of claim 11:
wherein the housing having a back surface corresponding to the back surface of the magnet;
the mounting projection disposed as substantially flush with the back surface of the housing.

14. A magnetic modular strip holder composed of individual magnetic holder units that are interconnected to form a linear magnetic strip holder of a desired length, each of the magnetic holder units comprising:
a magnet having a front surface, a back surface, and end surfaces;
an individual ferromagnetic plate disposed along and attached to the back surface of each magnet;
an elongate housing individually enveloping each magnet and the ferromagnetic plate, but not the end surfaces of the magnet, the housing comprising a front wall overlying the front surface of each magnet and a rear wall overlying the ferromagnetic plate; and
only one of the front wall and the rear wall of the housing expanding beyond the end surface of the magnet to lock with the housing of an adjacent individual magnetic holder unit to place the magnets of adjacent magnetic holder units in linear end-to-end abutting relationship.

15. A magnetic modular strip holder composed of individual magnetic holder units that are interconnected to form a linear magnetic strip holder of a desired length, each of the magnetic holder units comprising:
a magnet having a front surface, a back surface, a top surface, a bottom surface, and end surfaces;
an individual ferromagnetic plate disposed along and attached to the back surface of each magnet;
an elongate housing individually enveloping each magnet and the ferromagnetic plate, the housing comprising a singular unit overlying the front surface, the top surface, and the bottom surface of each magnet and the ferromagnetic plate, but not the end surfaces of the magnet; and
a separate connector integrated into each housing for interconnecting adjacent individual magnetic holder units in linear end to end relationship, the connector coplanar with the housing and shaped to be receivable in an opening formed the housing of an adjacent magnetic holder unit.

16. The magnetic modular strip holder of claim 1, wherein the connector is in the shape of a tongue to engage into a correspondingly shaped groove of the housing surface of an adjacent magnetic holder unit.

* * * * *

UNITED STATES PATENT AND TRADEMARK OFFICE
CERTIFICATE OF CORRECTION

| | | |
|---|---|---|
| PATENT NO. | : 11,938,613 B2 | |
| APPLICATION NO. | : 17/245773 | |
| DATED | : March 26, 2024 | |
| INVENTOR(S) | : J. Hurley | |

It is certified that error appears in the above-identified patent and that said Letters Patent is hereby corrected as shown below:

In the Claims

| Column | Line | Claim | |
|---|---|---|---|
| 6 | 25 | 1 | change "with eah" to -- with each -- |
| 8 | 27 | 1 | change "formed the" to -- formed in the -- |

Signed and Sealed this
Tenth Day of December, 2024

*Katherine Kelly Vidal*
Katherine Kelly Vidal
*Director of the United States Patent and Trademark Office*